UNITED STATES PATENT OFFICE.

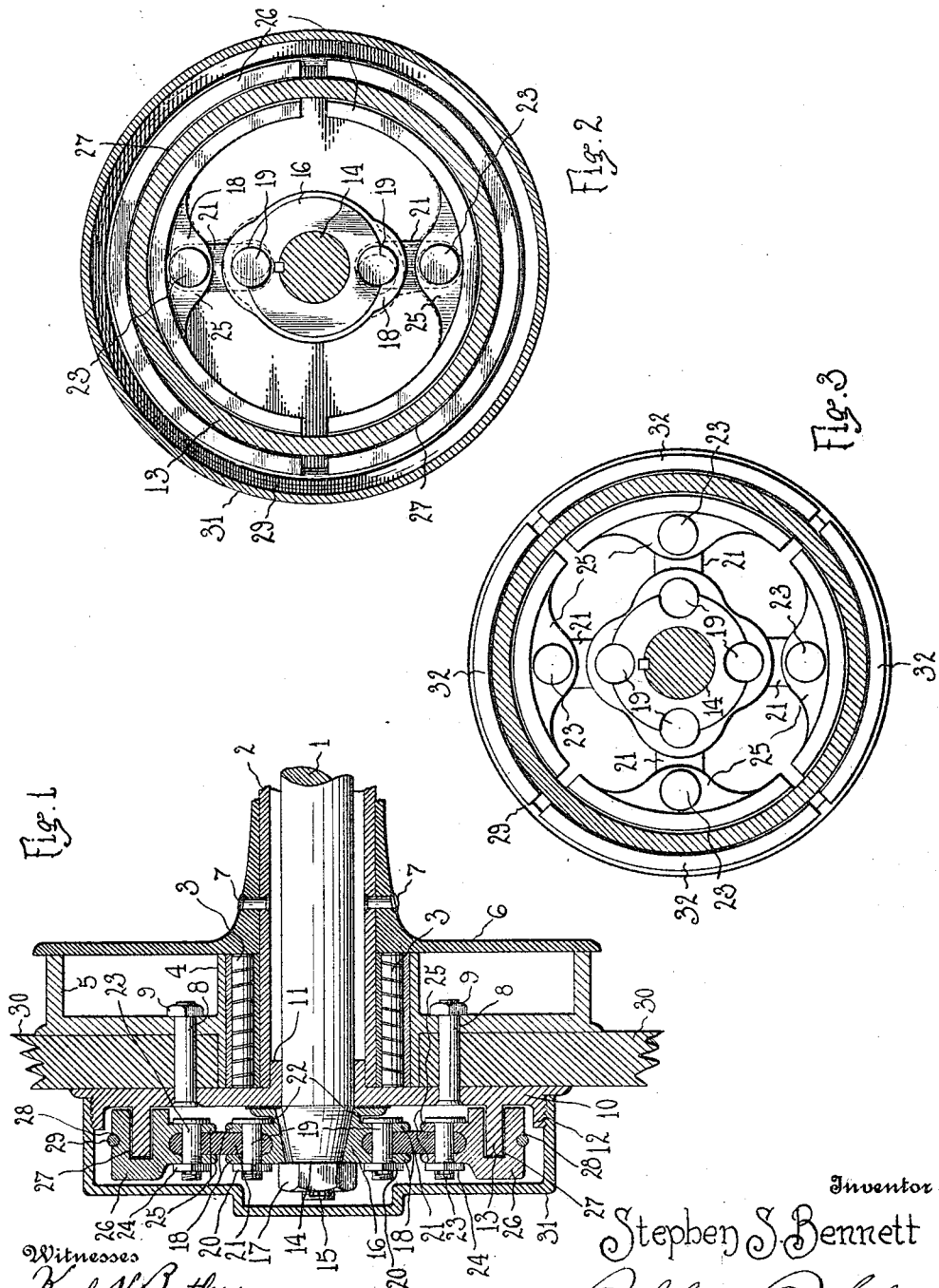

STEPHEN S. BENNETT, OF HIGHLAND PARK, MICHIGAN.

DIFFERENTIAL MECHANISM.

1,211,661. Specification of Letters Patent. Patented Jan. 9, 1917.

Application filed March 4, 1915. Serial No. 12,084.

*To all whom it may concern:*

Be it known that I, STEPHEN S. BENNETT, a citizen of the United States of America, residing at Highland Park, in the county of Wayne and State of Michigan, have invented certain new and useful Improvements in Differential Mechanisms, of which the following is a specification, reference being had therein to the accompanying drawings.

This invention relates to a differential for automobiles and other motor driven vehicles, and the primary object of my invention is to provide simple and effective means, in a manner as hereinafter set forth for releasing a driven wheel of a vehicle whereby it can freely revolve relative to the other wheels of a vehicle, particularly when the vehicle is making a sharp turn.

Another object of the invention is to provide the hubs of the driven wheels of a vehicle with automatically operated clutches that control the operation of the wheels relative to an axle or driven shaft.

A further object of this invention is to provide a strong, durable and inexpensive differential that is applicable to various types of automobile and highly efficient for increasing the road worthiness of the same, the differential being located whereby easy access can be had to the same for installation, repair and lubricating purposes.

The above and other objects are attained by a mechanical construction that will be hereinafter specifically described and then claimed, and reference will now be had to the drawings, wherein—

Figure 1 is a longitudinal sectional view of the differential; Fig. 2 is a cross sectional view of the same, and Fig. 3 is a similar view illustrating a slight modification of the invention.

In describing my invention by aid of the views above referred to, I desire to point out that the same are intended as merely illustrative of an example whereby my invention may be applied in practice, and I do not care to confine myself to the precise construction and arrangement of parts shown. The following description is therefore to be broadly construed as including substitute constructions and arrangements of parts which are the obvious equivalent of those to be hereinafter referred to.

In the drawing, 1 denotes a driven axle in the tubular axle casing 2 and on the end of said casing are roller bearings 3 for the hub 4 of a brake drum 5. Engaging the inner side of the brake drum 5 is a circular head 6 secured to the tubular axle casing, as at 7, and secured to the outer side of the brake drum by bolts 8, nuts 9 or other fastening means is a circular bearing member 10 having a hub 11 extending into the tubular axle casing 2 around the axle 1. Adjacent to the periphery of the bearing member 10 is a rim 12 which is exteriorly screw-threaded and concentric of said rim and of greater depth is an annular flange 13, constituting a clutch member.

The ends of the axle 1 terminate in a shank or tang 14 and an exteriorly screw-threaded stem or bolt 15. The shank or tang 14 has flattened facets and mounted thereon is a head 16 retained in place by a nut 17 or other fastening means on the stem or bolt 15. The head 16 has diametrically opposed sets of radiating lugs 18 and pivotally mounted between the lugs of each set by a bolt 19, a nut 20 or other pivotal means is a link 21. The head 16 is cut away or grooved, as at 22 to provide clearance for the heads of the bolts 19, as best shown in Fig. 1.

Pivotally connected to the outer ends of the links 21 by bolts 23, nuts 24 or other pivotal means are sets of inwardly projecting apertured lugs 25 carried by semi-circular or segment channel shoes 26 constituting clutch members. The channel 27 of each shoe receives the annular flange 13 and the peripheries of the shoe have grooves 28 for a retaining ring 29.

The bolts 8 or the fastening means of the bearing member 10 pass through the spokes 30 or the web of a vehicle wheel, and since the axle 1 is of the "full floating" type, the wheel is free to revolve when the axle 1 is stationary. Assuming that power is applied to the axle, the shoes or clutch members 26 are canted or tilted to that extent as to frictionally grip the clutch member 13 of the wheel, causing rotative continuity between the wheel and the axle 1. It is through the medium of the clutch members that one wheel of the vehicle can be driven independent of the other wheel, and to render the differential mechanism dust-proof and yet permit of easy access being had to the same, a cap 31 is screwed upon the rim 12.

In Fig. 3 of the drawings, there is illustrated a slight modification of the invention, wherein a plurality of shoes or clutch members 32 are employed in lieu of the opposed clutch members shown in Figs. 1 and 2. Provision is made for moving the shoes or clutch members 32 in synchronism, and otherwise the construction of the differential is similar to that of the preferred form.

In either instance, the outer walls of the channel shoes easily grip or release the flange 13, and the least retardation in the movement of a wheel, as when encountering an obstacle on a road causes the release of the wheel relative to the axle and thereby reduces to a minimum the stresses and strains upon the driving mechanism and power plant of an automobile. By placing the differential mechanism in proximity to the wheels, it is possible to use a one-piece axle and this axle may be of the semi-floating or any other desirable type.

What I claim is:—

1. In a differential mechanism, a driven axle, a wheel free to revolve thereon, a bearing member connected to said wheel, an outstanding annular flange adjacent the periphery of the bearing member, channel shoes having outer walls at the periphery of said annular flange and inner walls within the area of said annular flange, and means on the end of said axle confined between planes representing the width of said shoes and connected to the inner walls of said shoes adapted to shift the outer walls of said shoes on to the periphery of said flange and cause a clutching action between said axle and said wheel.

2. In a differential mechanism, a driven axle, a wheel free to revolve thereon, a bearing member connected to said wheel, an annular flange carried by said bearing member concentric of said axle, channel shoes adapted to be shifted inwardly to frictionally engage the periphery of said flange, a retaining ring engaging the outer sides of said channel shoes, a cap connected to said bearing member, and means mounted upon the end of said axle confined between planes representing the width of said shoes and connected to said shoes adapted to shift said shoes on to the periphery of said flange and cause a clutching action between said axle and said wheel.

In testimony whereof I affix my signature in presence of two witnesses.

STEPHEN S. BENNETT.

Witnesses:
ANNA M. DORR,
KARL H. BUTLER.

Copies of this patent may be obtained for five cents each, by addressing the "Commissioner of Patents, Washington, D. C."